Patented Apr. 6, 1926.

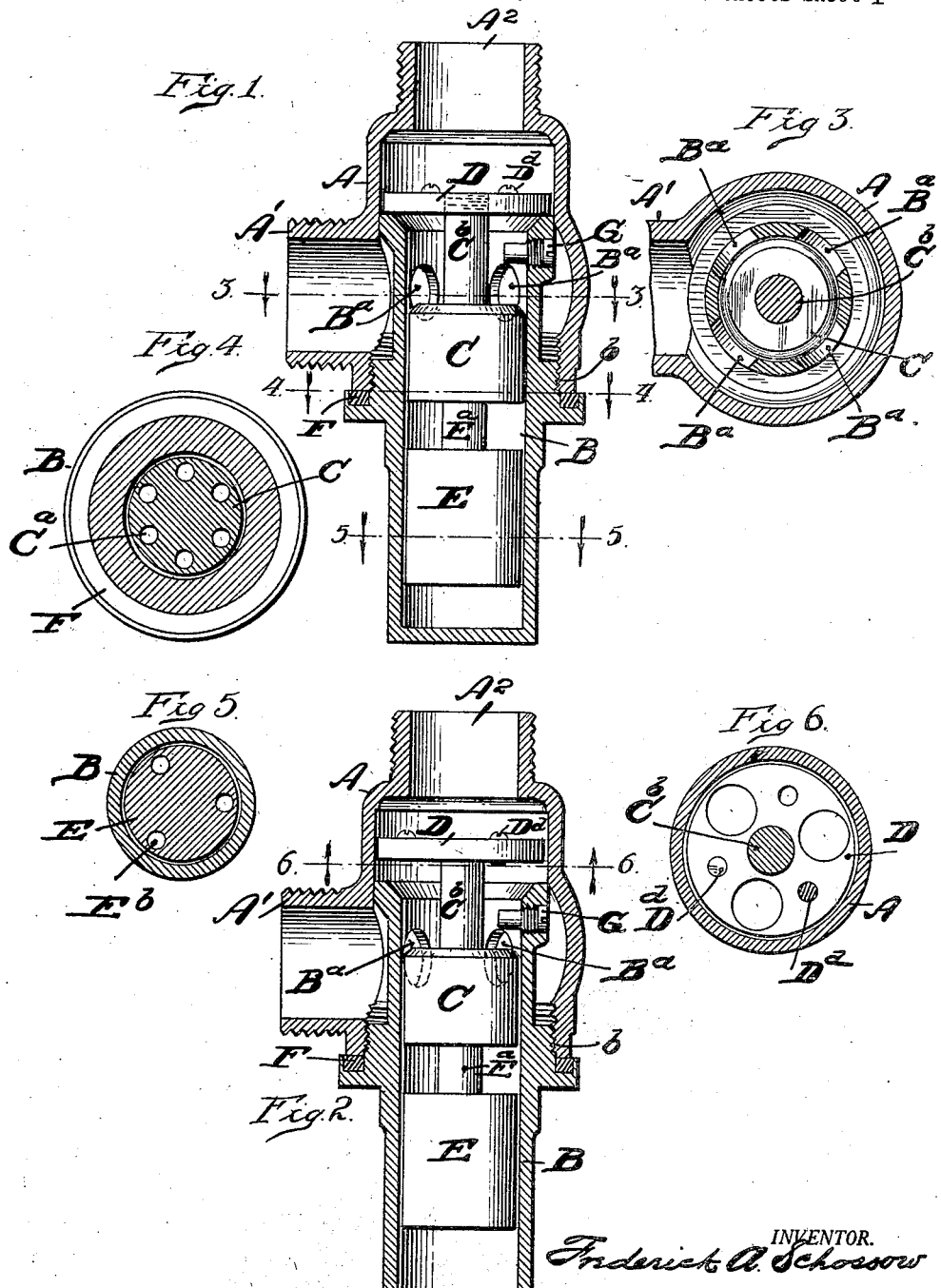

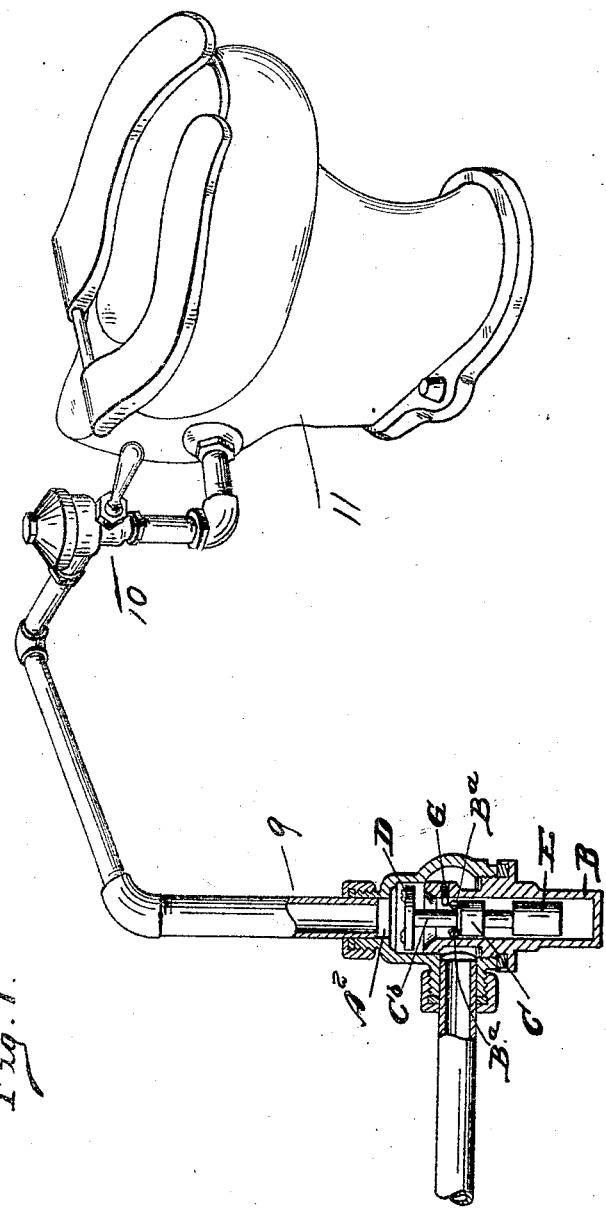

1,579,251

UNITED STATES PATENT OFFICE.

FREDERICK A. SCHOSSOW, OF DETROIT, MICHIGAN.

REGULATING VALVE.

Application filed May 20, 1925. Serial No. 31,512.

*To all whom it may concern:*

Be it known that I, FREDERICK A. SCHOSSOW, citizen of the United States, residing at Detroit, county of Wayne, State of Michigan, have invented a certain new and useful Improvement in Regulating Valves, and declare the following to be a full, clear, and exact description of the same, such as will enable others skilled in the art to which it pertains to make and use the same, reference being had to the accompanying drawings, which form a part of this specification.

My invention relates to a valve for automatically regulating and limiting the volume and velocity of water passing through the pipes of a water supply system that it may not exceed a predetermined fixed maximum volume and rate of flow at the point of discharge.

For example the present invention is especially designed for automatically governing the volume and flow of water delivered to a closet bowl to siphon the latter and is adapted to coordinate with a suitable manually actuated flushing valve controlling the delivery of water from the water supply to the bowl.

Heretofore it has been customary to employ a valve which may be partially closed to cut down the volume to the required amount —if the pressure should vary however it will be evident that a greater or less rate of flow is inevitable and with some valves of this type if the pressure is considerably less than the volume for which the valve is set the valve will remain open indefinitely as pressure is depended upon to close the valve. On the other hand if the pressure is greatly increased too much water will enter the bowl and what is known as "flooding" may result due to there being too much water present to permit the water "siphoning out" as rapidly as it enters the bowl—consequently it rises and overflows the top, a condition very apt to occur in cities in which it is customary to increase the water pressure when a fire occurs.

The primary object therefore of the present invention is to provide a regulating valve adapted to automatically control the passage of water to the bowl that a predetermined rate of flow may be maintained through the valve under all conditions where the pressure and volume are ample to maintain said predetermined rate of flow, or where the water pressure and volume are intermittently or constantly in excess of the required rate of flow.

A further object of the invention is to provide a device simple in construction embodying a single movable part loosely sleeved within the body of the valve and readily accessible.

A further object of the invention is to provide a device requiring no periodic adjustment or regulation and having been once set will insure a certain maximum rate of flow and prevent a greater rate of flow and automatically and instantly adjust itself to a wide range in volume and pressure—noiselessly—and with certainty of action.

Another feature of the invention is that should the pressure and volume drop below the maximum flow required, the valve will remain wide open offering no constriction to the free passage of water.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a vertical cross-sectional view through the device showing the movable piston-valve in its lowermost position as when offering no interruption to the pressure or volume of water passing through the valve chamber.

Figure 2 is a similar view showing the piston-valve raised to restrict the free flow of water through the valve.

Figure 3 is a cross-sectional view taken on or about line 3—3 of Figure 1.

Figure 4 is a cross-sectional view taken on or about line 4—4 of Figure 1.

Figure 5 is a cross-sectional view through the valve body and weighted end of the valve plunger, taken on or about line 5—5 of Figure 1.

Figure 6 is an inverted cross-sectional view taken on or about line 6—6 of Figure 2, showing removable means for regulating the flow of water through the piston.

Figure 7 is a perspective view illustrating the arrangement of the automatic regulating valve with relation to a manually operable valve and a closet bowl.

Referring now to the letters of reference placed upon the drawings:

A denotes the upper portion of the valve body having an extension $A^1$ at one side threaded to receive a pipe coupling connecting it with a pipe leading from a water supply system or tank—not shown. $A^2$ indicates an outlet at the upper end of the body screw-threaded for connection with a pipe 9 leading to a manually operated flushing valve 10 governing the delivery of water after passing the valve to a closet bowl 11 or other place of discharge.

B indicates a chamber for the plunger valve, having a screw-threaded connection at $b$ with the body A.

C designates a loosely fitted chamfered edge plunger valve, through which extends a plurality of bores $C^a$ for the passage of water. Supported in spaced relation to the plunger valve on a stem $C^b$ integral with the latter, is a piston D, loosely fitted to the bore of the chamber and perforated for the passage of water—a certain number of the perforations being closed with screws $D^d$—which may be removed if required for regulating the flow of water through the piston.

Spaced from the lower end of the piston D, on a stem $E^a$ integral with the latter, is a weighted plunger E also loosely fitted to the bore of the chamber. The plunger E, is provided with a plurality of bores $E^b$ extending therethrough, and reciprocates with the piston in the lower closed end of the chamber B.

F denotes a gasket lodged in an annular recess formed in a projecting flange of the body B to insure a tight joint between the upper body portion A and the chamber B housing the plunger-valve. $B^a$ denote ports through the wall of the chamber B, through which the water from the source of supply flows, and which may be constricted by the movement of the plunger valve C.

G indicates a screw supported in the wall of the valve body, its projecting end serving to limit the upward movement of the valve to prevent the latter from closing completely under a sudden or excessive pressure.

Having indicated the several parts by reference letters the construction and operation of the device will be readily understood.

As disclosed in the opening paragraphs of this specification the valve is installed in the pipe leading from a water main or other source of supply to a manually operated valve controlling the discharge of water to a closet bowl, or other releasing point.

The diameter of the piston mounted on the stem projecting above the regulating or plunger-valve is greater in diameter than the plunger-valve:—and the rate of the flow of water is determined by the area of the piston in relation to the number of openings therethrough—the greater the total area of the openings through the piston the greater will be the rate of flow, and conversely by closing or partly closing the openings with screw plugs or other suitable means a decrease in the fixed maximum rate of flow will result.

It will be obvious that any of a number of devices may be employed for varying or closing the openings through the piston for the passage of water—or the diameter of the piston may be sufficiently small so that no openings through the same will be necessary.

Upon manually operating the coordinating valve, faucet or other device previously referred to but not shown—water is permitted to flow through the regulating valve at a predetermined maximum rate of flow—the valve remaining motionless until the volume of water delivered to the valve exceeds the desired rate of flow. As soon as this rate is even slightly exceeded the excess impinging upon the lower surface of the piston causes the piston and valve to rise—the latter thereby partially closes the ports through the plunger valve chamber—thus restricting the port-openings and causing the excess water to be retained within the valve. As the pressure increases against the piston the latter automatically closes the ports to the required extent necessary to maintain the predetermined rate of flow—and in like manner a sudden lessening of the supply will result in a decreased pressure against the lower face of the piston which immediately responds by a downward movement of the valve, thereby increasing the area of the several port-openings through the wall of the valve chamber.

When the valve is employed to regulate the rate of flow from a pressure tank or like device in which the pressure gradually lessens but is primarily much in excess of the desired rate of flow, the valve—upon the pressure in the tank being released by a manually operated flushing valve—previously referred to but not shown—will instantly move upward in response to the pressure from the tank and as the pressure lessens the valve will drop until the ports in the wall of the valve chamber are wide open and offering no impediment to the passage of water through the chamber upon the flow being less than the predetermined rate.

It will now be apparent that the operation of the valve is entirely automatic. If the pressure exceeds the predetermined flow through the valve due to an excess of pressure—which may result from a variety of causes—the piston will automatically lift the valve restricting the size of the port orifices in the valve chamber through which the water may pass. On the other hand if the pressure falls below the predetermined amount the piston will descend lowering the valve and thus opening the ports for the free passage of water through the valve body.

Having thus described my invention what I claim is:

1. In a device of the character described; a valve body having a lateral inlet opening and a vertical discharge opening adapted for connection with a pipe line leading from a source of water supply under pressure to a manually operated valve controlling the discharge of water through the valve body; said valve body having a chambered portion below the discharge opening provided with port-openings for the passage of water from the inlet opening to the discharge opening in the valve body; and a piston-valve sleeved in said chambered portion and having a piston located above the lateral inlet and provided with a passage for the water and actuated by the water pressure, whereby the size of the port-openings through said chambered portion are automatically regulated by the piston valve so that a predetermined volume and pressure may pass through said valve body to the manually operated valve upon actuating the later to discharge the water.

2. In a device of the character described; a valve body having a lateral inlet opening and a vertical discharge opening respectively adapted for connection with pipes leading from a source of water supply under pressure to a manually controlled device governing the passage of water through the valve body; a chambered portion screwed into the valve body below the discharge opening and provided with port openings within the valve body for the passage of water from said inlet opening to the discharge opening; and a weighted piston-valve movable within the chambered portion for regulating the size of said port openings; said piston-valve having a piston located above a lateral inlet and provided with an opening for the passage of the water and actuated by the pressure of water applied to the piston in its passage through the valve body.

3. In a device of the character described; a body portion having a lateral inlet opening and a vertical discharge opening respectively adapted for connection with pipes leading from a source of water supply under pressure to manually controlled means governing the passage of water through the same; a chambered portion screwed into the body portion below the discharge opening and provided with port-openings for the passage of water from the inlet opening to the discharge opening; and a loose fitted weighted piston-valve slidable in said chambered portion having a piston located above the lateral inlet and having an opening for the passage of the water and adapted to be activated by the pressure of water through the said body portion, whereby the size of said port-openings may be regulated to a predetermined volume and pressure of water.

4. In a device of the character described; a body portion having inlet and discharge openings respectively adapted for connection with pipes leading from a source of water supply under pressure to manually controlled means governing the passage of water through the same; a chambered portion screwed into the body portion provided with port-openings for the passage of water from the inlet opening to the discharge opening; a weighted piston-valve slidable in said chambered portion having a plurality of bores for the passage of water through the piston and valve portions; and means for regulating the openings through said piston, whereby a predetermined water pressure applied to the piston will actuate its valve portion and regulate the size of the port openings through the chambered portion accordingly.

5. In a device of the character described: a valve body having a lateral inlet opening and a vertical discharge opening; a chambered portion screwed into the valve body having port openings for the passage of water from said inlet opening to the discharge opening; a weighted piston valve movable within the chambered portion for regulating the size of said port-openings, said piston-valve having a piston located above the lateral inlet opening and provided with an opening for the passage of the water and actuated by the pressure of water applied to the piston resulting from the passage of the water through the valve body; and means for limiting the movement of said piston-valve.

6. In a device of the character described; a valve body having an inlet and a discharge opening; said valve body having a chambered portion closed at its lower end and port-openings through which water may pass through the body from the inlet to the discharge opening; a loosely fitted piston-valve sleeved in said chambered portion comprising a piston having a plurality of bores for the passage of water; a plunger-valve adapted to regulate the size of the port-openings, having a plurality of bores for the passage of water; a weighted plunger having a plurality of bores for the passage of water, said piston, plunger-valve and weighted plunger being connected in spaced relation and operable as a unit, within said chambered portion, when actuated by the pressure of the water upon the piston in passing through the valve body.

In testimony whereof, I sign this specification.

FREDERICK A. SCHOSSOW.